Nov. 9, 1965    H. ISCH ETAL    3,217,273
TRANSMIT-RECEIVE POLARIZATION FILTER
Filed Dec. 5, 1962

INVENTORS:
HANS ISCH and
KURT SCHIESS
BY McGlew and Toren,
attorneys

United States Patent Office 3,217,273
Patented Nov. 9, 1965

3,217,273
TRANSMIT-RECEIVE POLARIZATION FILTER
Hans Isch, Genf, and Kurt Schiess, Heerbrugg, Switzerland, assignors to Albiswerk Zuerich A.G., Zurich, Switzerland
Filed Dec. 5, 1962, Ser. No. 242,451
Claims priority, application Switzerland, Dec. 8, 1961, 14,288
9 Claims. (Cl. 333—13)

This invention pertains, in general to T-R (transmit-receive) switches and, in particular, to an improved T-R switch for directly coupling a fraction of the transmitted power and nearly all of the received power into a receiver particularly in distance measuring equipment.

Systems for measuring distances using continuous-wave (C-W) energy transmission are becoming increasingly important as compared with conventional pulse-reflection methods. For this, a transmitter and a receiver are loaded at the end points of the distance to be measured, the radiation from the transmitter at one end being polarized in a plane perpendicular to that of the radiation from the transmitter at the other end. In order to make the equipment convenient for transporting, a common antenna is used for transmitter and receiver. However, in an arrangement of this sort an isolating device for the separation of the transmitted and received energy is necessary. In particular, the peak transmitter energy must not be allowed to penetrate into the associated receiver, otherwise the receiving diode would be destroyed.

Distance measuring equipment and radar equipment operating with continuous waves (C-W) work on the basis of a phase comparison between radiated and received modulation waves. In order to produce this comparison, a part of the transmitted energy must be mixed with the received energy. Since, however, the receiver input must be protected against the high transmitter energy by the isolating device, a small part of the transmitter energy must normally be fed to the mixer state via a special conductor.

In presently known polarization wave filters, there is provided a circular hollow wave guide, with an input and an output aperture, and an auxiliary hollow wave guide. This auxiliary hollow wave guide is supplied from the circular hollow wave guide in such a manner that the electromagnetic wave energy may be fed to the auxiliary hollow wave guide only if the polarization plane is in a predetermined direction.

In radar apparatus, where the transmitter high-power wave and the reflected low-power wave are polarized in the same plane, it is known to separate the two waves in such a manner. This separation requires a special device for rotating the polarization plane of the high-power wave through 90°, and for feeding the low-power wave in its original plane. This preserves the receiver input from any leakage of transmitter signals.

Accordingly, one object of the present invention is to provide a T-R switch which will couple a certain fraction of the transmitted energy and substantially all of the received energy directly into a receiver without the need for special and additional conductor means for guiding, or conducting, a portion of the transmitted energy to the input of the receiver.

Another object of the invention is to provide a T-R switch useful in continuous wave (C-W) transmission systems for directly coupling received, or reflected, electromagnetic energy together with a fraction of transmitted electromagnetic energy into the mixing stage of a receiver.

Another object of the invention is to provide a T-R switch including a means for coupling both received energy and transmitted energy into a receiver wherein the geometric arrangement of said decoupling means is not critical.

Another object of the present invention is to provide a T-R switch which is highly reliable and may be easily and economically assembled.

In accordance with one embodiment of the present invention, there is provided a T-R switch comprising: a circular cross-section first hollow wave guide section; a rectangular cross-section second hollow wave guide section, said first and second wave guide sections having their longitudinal axes in alignment; a conical third hollow wave guide section coupled with said first and second wave guide sections, said third wave guide section having its longitudinal axis in alignment with the longitudinal axis of said first wave guide section and congruent with the longitudinal axis of said second wave guide section, said third wave guide section functioning as a transformation member; and a rectangular cross-section fourth hollow wave guide section, the hollow cross-section of said fourth wave guide section being in communication with the circular cross-section of said first wave guide section, the longitudinal axis of said fourth wave guide section being orthogonally arranged with respect to the longitudinal axes of said first, second and third wave guide sections, the longitudinal axis of said fourth wave guide section being off-set by a predetermined angle with respect to a shorter side of said second rectangular wave guide section.

In accordance with another illustrative embodiment of the invention there is provided a pick-up probe, instead of said fourth wave guide section; the longitudinal axis of said pick-up probe being angularly off-set by a predetermined angle with respect to a shorter side of said second wave guide section.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which there are illustrated and described preferred embodiments of the invention.

Figure 1:
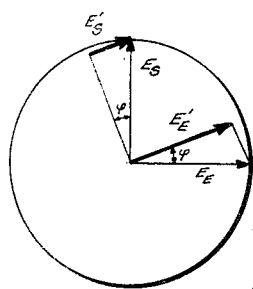
FIG. 1 is a vectorial representation showing the orthogonal arrangement of the electric field of the transmitted wave with respect to the received wave, as well as the directions of other vectorial components of the transmitted and received waves.
Figure 2:
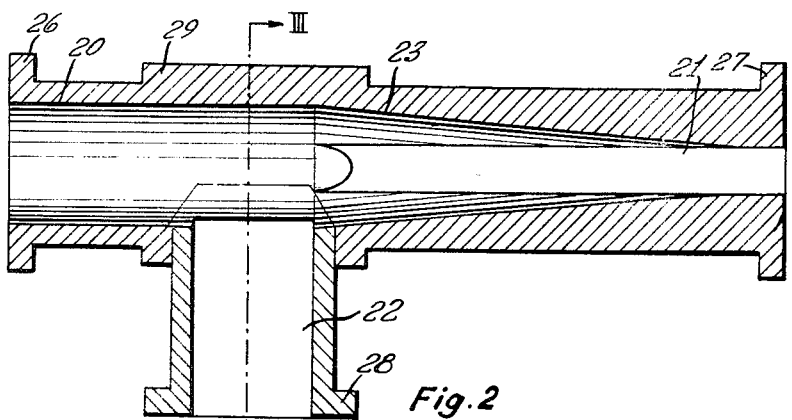
FIG. 2 is a longitudinal cross-section of a T-R switch according to the present invention; the longitudinal section shown at FIG. 2 being taken along the lines II—II of FIG. 3.
Figure 3:
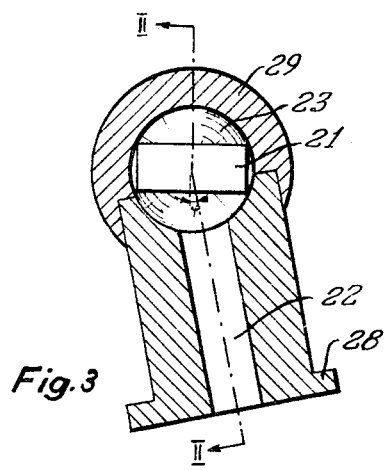
FIG. 3 is a sectional view of the wave guide of FIG. 2 as taken along the lines III—III of FIG. 2.

FIGS. 2 and 3 illustrate one embodiment of the T-R switch of the present invention which functions according to the principle illustrated in the vector diagram of FIG. 1; the principle of operation illustrated at FIG. 1 being discussed hereinafter in greater detail. A hollow wave guide section 20 having a circular cross-section is provided with a connection flange 26 at one end thereof. In direct axial communication with the circular cross-section hollow wave guide section 20 there is another hollow wave guide section 23. Both wave guide sections 20 and 23 have their longitudinal axes in alignment. As can be seen from FIGS. 2 and 3, the hollow wave guide section 20, having a circular cross-section, defines a cylindrical space for the passage of transmitted and received electromagnetic waves, but the wave guide section 23 defines a conical space therewithin. As may be appreciated from FIGS. 2 and 3, the cylindrical space of the wave guide 20 is in direct communication with the conical space of the wave guide section 23, their longitudinal axes being in direct alignment. The larger diameter of the conical space is equal to the diameter of the cylindrical space. The conical wave guide 23 is a quarter wave transformer and is reciprocal.

A hollow wave guide 21 having a rectangular cross-section is situated, coaxially, within the conical wave guide section 23. As shown, the smaller diameter of the conical wave guide section 23 coincides with, or is of the same dimension as, the shorter cross-sectional side of the hollow rectangular wave guide section 21. For example, the longitudinal slope of the wave guide section 23 is 7.03% for an operating frequency of 9.6 kilomegacycles. Integrally formed at one end of the conical wave guide section 23 is another connection flange 27. The connection flange 27 is adaptable for being coupled with a transmitter including, for example, a magnetron or a klystron (not shown). The connection flange 26 at the other end of the wave guide section 20 is adapted for being coupled to an antenna (not shown).

As shown at FIG. 2, there is arranged another hollow wave guide section 22 having a rectangular cross-section, the wave guide section 22 being in communication with the wave guide section 20 which has a suitably apertured raised portion 29 within which the wave guide section 22 is orthogonal with respect to the longitudinal axis of the wave guide sections 20, 23 and 21. However, as illustrated at FIG. 3, the longitudinal axis of the hollow wave guide section 22 is angularly off-set with respect to the shorter dimension, or width dimension, of the rectangular wave guide section 21 by the angle $\varphi$. As shown at FIGS. 2 and 3, the wave guide section 22 is in communicating arrangement with wave guide sections 20, 23 and 21 adjacent the portion at which there occurs a transition from the cylindrical space of the wave guide section 20 to the conical space of the wave guide section 23 and the rectangular cross-section hollow wave guide section 21.

Situated at an end of the wave guide section 22 is a connection flange 28; the connection flange 28 being adapted for coupling with the mixing stage of a receiver (not shown).

FIG. 1 illustrates, in vectorial form, the principle of operation of the T-R switch just described. The vector $E_E$ represents the polarization direction of the electric field of the received power and the vector $E_S$ represents the polarization direction of the electric field of the transmitted power in the hollow, circular cross-section of the wave guide section 20. The vector $E'_E$ has, compared to the vector $E_E$, an angle $\varphi$ and propagates along the longitudinal axis of the wave guide section 22. Similarly, the vector $E_S$ propagates along the longitudinal axes of the wave guide section 20. Another component of the vector $E_S$ is angularly off-set with respect thereto by the angle $\phi$; the vector $E'_E$ and the other angularly off-set vector component of the vector $E_S$ are mutually perpendicular.

Accordingly, the power absorbed by the hollow wave guide section 22 is as follows:

The received power absorbed is:

$$N_E \approx E_E \cos^2 \varphi$$

The transmitted power absorbed is:

$$N_S \approx E_S \sin^2 \varphi$$

Thus, in accordance with these relationships, the angle $\varphi$ is determined by the transmitted power. The angle $\varphi$ is selected to be smaller for a powerful transmitter and relatively larger for a weaker transmitter; the amount of power coupled into the receiver through the wave guide section 22 is determined by the character of the mixing stage of the receiver (e.g., the mixing electron tube).

With respect to FIGS. 2 and 3, it is to be understood that instead of the conical wave guide section 23, which is used as a transformation member, a quarter-wave transformer could, as is well known in the art, be used.

Figure 4:
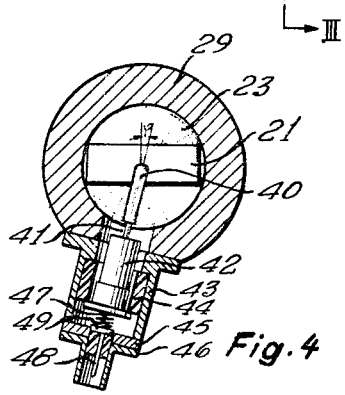
FIG. 4 is another embodiment of the T-R switch of the present invention, illustrating the manner in which a coaxial cable coupling and probe element may be coupled with the T-R switch of the present invention to translate transmitted and received waves to a receiver.

In FIG. 4 there is shown another embodiment of the T-R switch according to the invention. In the embodiment shown at FIG. 4, it is possible to directly decouple a fraction of the transmitted wave energy and the received wave energy at the transformation region, which is the region where the cylindrical space of the wave guide section 20 meets the conical space of the wave guide section 23. FIG. 4 is a section view in the same plane as that shown in FIG. 3 with the exception that the angularly off-set (angle $\varphi$) decoupler is coupled into the wave guide section 20 from the left. (It is to be understood that the angular off-sets to the left and to the right are in accordance with the orientations illustrated at FIGS. 4 and 3, respectively.)

As shown at FIG. 4, there is arranged a pick-up probe 40, which protrudes into the cylindrical space of the wave guide section 20. This probe 40 is held in place by a cathode pin 41 of a mixing diode 42. The probe 40 may be press-fitted onto the cathode pin 41. The mixing diode 42 is situated within a housing 43 and is held in place by an insulating sleeve 44 and by a coil spring 47. The housing 43 is provided at one end with a cover 45 on which there is fastened a socket 46 adaptable for receiving a coaxial connector. A center pin 48 is provided on the underside of a plate 49 which, as shown, is in contact with the coil spring 47. Thus, the mixed transmission power and received power is translated through the diode 42 from the pick-up probe 40 through the spring 47 to the coaxial plug 46 and pin 48.

While specific embodiments of the invention have been shown and described in detail to illustrate the application of the inventive principles, it will be understood that the invention may be embodied otherwise without departing from such principles.

What is claimed is:

1. In a transmit-receive polarization filter, for use in transmitting and receiving energy in which the transmitted energy and the received energy have mutually perpendicular polarization planes, including a hollow first wave guide section having a circular cross section, a hollow second wave guide section having a rectangular cross section, a transformation member coupling the first and second wave guide sections, and an auxiliary guide coupled with the first wave guide section, said transmit-receive polarization filter being characterized in that the auxiliary guide is a hollow wave guide having a rectangular cross section, and coupled to said first wave guide section at a distance equal to an even multiple of quarter wave lengths from said transformation member, the longitudinal axis of said auxiliary guide forming a predetermined angle of the order of from 5° to 30° with the shorter side of the rectangular section of the second wave guide section.

2. A transmit-receive polarization filter, for use in transmitting and receiving energy in which the transmitted energy and the received energy have mutually perpendicular polarization planes, comprising: a first hollow wave guide section having a circular cross section and including an aperture through a wall section thereof; a second hollow wave guide section having a rectangular cross section, said first and second hollow wave guide sections extending in continuation of each other and having their longitudinal axes in alignment; a third hollow wave guide section having a conical space therein, said third wave section encompassing said second wave guide section, and the longitudinal axis through the conical space of said third wave guide section being congruent with the longitudinal axis of said second wave guide section; said aperture being spaced an even multiple of quarter wave lengths from said third wave guide section; conductor means coupled with said first wave guide section through said aperture therein and being arranged perpendicular to the axes of said first, second and third wave guide sections and angularly offset by a predetermined angle of the order of from 5° to 30° with respect to the shorter dimension of the rectangular cross section of said second wave guide section; diode means connected to said conductor means; and connector means coupled with said diode means.

3. A transmitting-receiving switch, according to claim 2, wherein said conductor means is an elongated pick-up probe.

4. A transmitting-receiving switch according to claim 2, wherein said connector means is a coaxial cable connector.

5. A transmit-receive polarization filter, for use in transmitting and receiving energy in which the transmitted energy and the received energy have mutually perpendicular polarization planes, comprising a circular wave guide, a rectangular wave guide, a transformation wave guide interposed between said circular and rectangular wave guide, and coupling means for absorbing part of the power transmitted through said wave guides and substantially all of the power received by said wave guides, said coupling means being coupled with said circular wave guide at a spacing equal to an even multiple of quarter wave lengths from said transformation wave guide, and aligned with respect to said rectangular wave guide so that the longitudinal axis of said coupling means forms, with the shorter side of the cross section of said rectangular wave guide, a predetermined angle of the order of from 5° to 30°.

6. A transmitting-receiving switch according to claim 5, wherein the coupling means is an auxiliary wave guide.

7. A transmitting-receiving switch according to claim 5, wherein said coupling means is a pick-up probe coupled with said circular wave guide.

8. A transmitting-receiving switch according to claim 5, wherein said coupling means comprises a pick-up probe coupled with said circular wave guide and a mixing diode coupled with said pick-up probe.

9. A transmitting-receiving switch according to claim 2, wherein said transformation wave guide is a tubular conductor having a conical space therein.

References Cited by the Examiner
UNITED STATES PATENTS

| | | | |
|---|---|---|---|
| 2,810,890 | 10/57 | Klopfenstein | 333—21 |
| 2,839,729 | 6/58 | Gibson | 333—6 |
| 2,872,648 | 2/59 | Gibson | 333—6 |

HERMAN KARL SAALBACH, *Primary Examiner.*

ELI LIEBERMAN, *Examiner.*